United States Patent Office 3,778,480
Patented Dec. 11, 1973

3,778,480
PROCESS FOR POLYMERIZATION OF TETRAHYDROFURAN
Kazuo Matsuda, Wakayama, Yoshiaki Tanaka, Osaka, and Takeyo Sakai, Wakayama, Japan, assignors to Kao Soap Co., Ltd., Tokyo, Japan
No Drawing. Filed Sept. 13, 1971, Ser. No. 180,218
Claims priority, application Japan, Sept. 16, 1970, 45/81,007
Int. Cl. C07c 41/00, 43/02
U.S. Cl. 260—615 B                          5 Claims

ABSTRACT OF THE DISCLOSURE

Tetrahydrofuran is polymerized in the presence of a catalyst system of 5–50 percent by weight of fuming sulfuric acid, based on the weight of tetrahydrofuran, and 0.01–70 mol percent of fluorine-containing compound, based on the free $SO_3$ in the fuming sulfuric acid.

BACKGROUND OF THE INVENTION

Field of the invention

This invention relates to a process for ring-opening polymerization of tetrahydrofuran (which is sometimes abbreviated as THF hereinafter) in the presence of a catalyst of a fuming sulfuric acid-fluorine compound system.

Description of the prior art

Ordinarily, tetrahydrofuran is subjected to ring-opening polymerization in the presence of a Lewis acid catalyst and some of the protonic acids, and there are produced various polymers ranging in state from liquid to solid, depending on the degree of polymerization. It is, however, necessary to stop the polymerization by adding water and then hydrolyzing the chlorine atoms and acetylester groups at the terminals of the polymer to convert same completely to hydroxyl groups for obtaining a polymer having diols at both ends. For this process, severe reaction conditions are required, and the process becomes more complicated, resulting in an increased loss of the polymer. Moreover, when using fluorosulfonic acid as a catalyst, hydrolysis can be readily carried out in an acidic condition, but there are some problems of corrosion of the materials of the apparatus used and danger in handling due to the presence of co-existing hydrofluoric acid.

We have proposed a process using fuming sulfuric acid catalyst (Japanese patent application No. 15,932/1969, corresponding to U.S. Ser. No. 13,839, now Pat. No. 3,712,930) and a process using a fuming sulfuric acid-perchloric acid system catalyst (Japanese patent application No. 20,665/1969, corresponding to U.S. Ser. No. 18,298, now Pat. No. 3,714,266) for overcoming these defects; however, in the former process polymers having the molecular weight higher than 1,200 are difficult to obtain, and in the latter process polymers having a molecular weight higher than 3,000 can be obtained but they are colored to pale brown.

We have extensively investigated in order to solve these difficult problems, and discovered a process for polymerizing tetrahydrofuran in the presence of a catalyst consisting of fuming sulfuric acid and a small amount of fluorine-containing compound.

SUMMARY OF THE INVENTION

This invention provides a process for polymerization of tetrahydrofuran in the presence of fuming sulfuric acid and about 0.01–about 70 mol percent of fluorine-containing compound, based on the free $SO_3$ in the fuming sulfuric acid.

Usually there is used fuming sulfuric acid having a free $SO_3$ concentration of about 23–28 percent which is readily available commercially, but fuming sulfuric acid of other grades and concentrations may be used. However, when fuming sulfuric acid having a free $SO_3$ concentration higher than 43 percent is employed, an appropriate diluent is necessary.

As the fluorine-containing compound, there are used inorganic and organic fluorine-containing compounds which are capable of dissolving in fuming sulfuric acid of various concentrations, for example, sodium fluoride, potassium fluoride, ammonium fluoride, fluorosulfonic acid, borofluoric acid, ammonium borofluoride, potassium borofluoride, boron trifluoride and their ether complexes, and fluorobenzene, fluorotoluene, 2-fluoroethanol, trichlorofluoromethane (Freon 11), and trichlorotrifluoroethane (Freon 113).

The amount of the catalyst to be used in the invention is in the range from about 5 to 50 percent by weight of fuming sulfuric acid, based on the weight of tetrahydrofuran.

The polymerization reaction can be carried out by contacting tetrahydrofuran with the catalyst of this invention in the presence or absence of a solvent. It is preferable to use a polymerization solvent only when it is necessitated, because it usually causes reduction of the rate of polymerization. Particularly when using fuming sulfuric acid having a free $SO_3$ concentration higher than 43 percent, a solvent should be employed, as the resultant polymer will be changed and colored so greatly that the color cannot be removed even by a post-treatment using no solvent.

As the solvent, there may be exemplified aliphatic hydrocarbons, alicyclic hydrocarbons, halogenated hydrocarbons, ethers, nitroparaffins, and other materials which do not affect adversely the polymerization reaction. There is no limit as to the amount of the solvent to be used.

The polymerization reaction may be performed either in a nitrogen atmosphere or in air, if the reaction is kept free from moisture: the polymerization temperature is in the range of from −40° C., to 80° C., preferably from −20° C. to 10° C.

Although other halogen-containing compounds may be used for producing polymers instead of fluorine compounds, the halogen remains in the produced polymer and cannot be removed even by a post-treatment; thus they are not preferable.

According to the process of this invention, the following unexpected effects can be obtained:

(1) The molecular weight and the yield of the polymer can be increased by combining fuming sulfuric acid and a small amount of fluorine-containing compound.

(2) The molecular weight of the polymer can be optionally controlled by varying the amount of a catalyst against the weight of tetrahydrofuran, keeping constant the blending ratio of fuming sulfuric acid with the fluorine-containing compound. By reducing the amount of the catalyst, the molecular weight of the polymer is increased.

(3) The polymerization apparatus is less subject to corrosion.

(4) There can be produced a polymer having the molecular weight higher than 3,000 with a good yield and a satisfactory hue or color.

Illustrative examples of this invention are set forth hereinafter, but these do not limit the scope of this invention.

In the examples, parts and percentages are all by weight, unless otherwise noted.

EXAMPLE 1

One hundred (100) parts of THF were placed in a 500 ml. four-mouthed flask provided with an agitator, a thermometer, a condenser, and a dropping funnel; the vessel was externally cooled and a nitrogen atmosphere was maintained therein. The contents were well agitated, and the temperature in the system was maintained in the range of from −5° C. to 0° C., while a given amount of a catalyst prepared by dissolving a given amount of potassium fluoride in fuming sulfuric acid at room temperature was added dropwise. After the end of the addition of the catalyst, the contents were further agitated at a temperature of from −5° C. to 0° C. for 2 hours. Then, 200 parts of water were added to stop the polymerization. A dehydration tube was attached to a reflux condenser; the reaction product was agitated and heated over a water bath and the unreacted monomer was recovered from the dehydration tube. The product was further heated and agitated continuously at 90–100° C. for 2 hours to hydrolyze the terminals of the polymer. The product was allowed to stand and cool and it separated into two layers. The upper layer was collected, neutralized, dehydrated, and desalted to obtain a refined polyether having diols at both terminals.

The effect of variations of the amount of catalyst used on the rate of polymerization and the molecular weight are shown in Table 1.

TABLE 1.—RELATIONS BETWEEN THE AMOUNT OF CATALYST AND THE YIELD AND THE MOLECULAR WEIGHT OF THE PRODUCED POLYMER

[Weight ratio of 28% fuming sulfuric acid/KF≅58.6 (constant)]

|  | 28% fuming sulfuric acid (g.) | | |
| --- | --- | --- | --- |
|  | 15 | 25 | 34 |
| KF (g.) | ~0.26 | ~0.43 | 0.58 |
| Yield (percent)—based on monomer | 43.6 | 59.7 | 60.7 |
| Average molecular weight—of polymer—calculated from the terminal OH groups | 1,616 | 1,289 | 1,014 |

CONTROL 1

According to the process described in Example 1, polymerization was performed in the presence of a catalyst consisting of only fuming sulfuric acid. The results are shown in Table 2.

TABLE 2.—RELATIONS BETWEEN THE AMOUNT OF CATALYST AND THE YIELD AND THE MOLECULAR WEIGHT OF THE PRODUCED POLYMER

| 28% fuming sulfuric acid (g.) | 15 | 25 | 34 |
| --- | --- | --- | --- |
| Yield (percent)—based on monomer | 26 | 49 | 59.5 |
| Average molecular weight—calculated from the terminal OH groups | 1,007 | 1,010 | 760 |

As will be seen by comparing Table 1 and Table 2, the molecular weight and the yield can both be increased by the use of a catalyst consisting of fuming sulfuric acid and a small amount of potassium fluoride added thereto, compared with a catalyst consisting of only fuming sulfuric acid. Moreover, the molecular weight can be varied in a controllable fashion by adjusting the amount of the catalyst.

EXAMPLE 2

Polymerization was performed according to a process wherein a given amount of potassium fluoride was directly added to THF, instead of dissolving the potassium fluoride in fuming sulfuric acid as in Example 1, and then fuming sulfuric acid was added to the mixture dropwise. The results are shown in Table 3.

TABLE 3.—RELATIONS BETWEEN THE AMOUNT OF CATALYST AND THE YIELD AND THE MOLECULAR WEIGHT OF THE PRODUCED POLYMER

[THF=100 g., 28% fuming sulfuric acid/KF≅58.6 (constant)]

|  | 28% fuming sulfuric acid (g.) | | |
| --- | --- | --- | --- |
|  | 15 | 25 | 34 |
| KF (g.) | 0.256 | 0.426 | 0.58 |
| Yield (percent)—based on monomer | 43.0 | 59.0 | 57.9 |
| Average molecular weight of polymer—calculated from the terminal OH groups | 1,500 | 1,138 | 956 |

As seen in Table 3, there were obtained results similar to those reported in Table 1.

EXAMPLE 3

According to the process described in Example 1, 100 parts of THF were polymerized in the presence of a catalyst consisting of a mixture of 28 percent fuming sulfuric acid and Freon 113 (B.P. 47.6° C.) and poly(tetrahydrofuran) having the hue of APHA 20–25 was produced. The results are shown in Table 4.

TABLE 4.—RELATIONS BETWEEN THE AMOUNT OF CATALYST AND THE MOLECULAR WEIGHT AND THE YIELD OF THE PRODUCED POLYMER

[Weight ratio of 28% fuming sulfuric acid/Freon 113 ≅18.18 (constant)]

|  | 28% fuming sulfuric acid (g.) | | |
| --- | --- | --- | --- |
|  | 15 | 25 | 34 |
| Freon-113 (g.) | 0.83 | 1.38 | 1.87 |
| Yield (percent)—based on monomer | 30.5 | 57.68 | 58.8 |
| Average molecular weight—calculated from the terminal OH groups | 1,289 | 1,199 | 939 |

EXAMPLE 4

According to the process described in Example 1, 100 parts of THF were polymerized in the presence of a catalyst consisting of a mixture of 23 percent fuming sulfuric acid and ammonium fluoride, and the results shown in Table 5 were obtained.

TABLE 5.—RELATIONS BETWEEN THE AMOUNT OF CATALYST AND THE MOLECULAR WEIGHT AND THE YIELD OF PRODUCED MONOMER.

[Weight ratio of 23% fuming sulfuric acid/NH$_4$F≅91.9 (constant)]

|  | 23% fuming sulfuric acid (g.) | | |
| --- | --- | --- | --- |
|  | 15 | 25 | 34 |
| NH$_4$F (g.) | 0.163 | 0.272 | 0.37 |
| Yield (percent)—based on monomer | 39.8 | 55.0 | 58.6 |
| Average molecular weight—calculated from the terminal OH groups | 1,550 | 1,152 | 997 |

CONTROL 2

Polymerization was performed under the same conditions as used in Example 4, except that the catalyst consisted only of 23 percent fuming sulfuric acid, and the following results were obtained.

TABLE 6.—RELATIONS BETWEEN THE AMOUNT OF CATALYST AND THE MOLECULAR WEIGHT AND THE YIELD

[THF=100 parts]

| 23% fuming sulfuric acid (g.) | 15 | 25 | 34 |
| --- | --- | --- | --- |
| Yield (percent)—based on monomer | 19.1 | 41.7 | 50.6 |
| Average molecular weight—calculated from the terminal OH groups | 1,018 | 1,027 | 842 |

As clearly seen by comparison of Table 5 and Table 6, the addition of ammonium fluoride was obviously effective to increase the yield and molecular weight of the produced polymer.

EXAMPLE 5

According to the process described in Example 1, 100 parts of THF were polymerized in the presence of a catalyst consisting of a mixture of 28 percent fuming sulfuric acid and fluorosulfonic acid. The results are shown in Table 7.

TABLE 7.—RELATIONS BETWEEN THE AMOUNT OF CATALYST AND THE MOLECULAR WEIGHT AND THE YIELD OF PRODUCED POLYMER

[Weight ratio of 28% fuming sulfuric acid/$FSO_3H$=19.8 (constant)]

|  | 28% fuming sulfuric acid (g.) | | |
|---|---|---|---|
|  | 15 | 25 | 34 |
| $FSO_3H$ (g.) | 0.76 | 1.26 | 1.72 |
| Yield (percent)—based on monomer | 56.0 | 61.0 | 59.9 |
| Average molecular weight—calculated from the terminal OH groups | 1,774 | 1,426 | 1,146 |

EXAMPLE 6

According to the process described in Example 1, 100 parts of THF were polymerized in the presence of a catalyst consisting of a mixture of 28 percent fuming sulfuric acid and potassium borofluoride. The results are shown in Table 8.

TABLE 8.—RELATIONS BETWEEN THE AMOUNT OF CATALYST AND THE MOLECULAR WEIGHT AND YIELD OF PRODUCED POLYMER

[Weight ratio of 28% fuming sulfuric acid/$KBF_4$≅27.2 (constant)]

|  | 28% fuming sulfuric acid (g.) | | |
|---|---|---|---|
|  | 15 | 25 | 34 |
| $KBF_4$ (g.) | 0.55 | 0.92 | 1.25 |
| Yield (percent)—based on monomer | 63.7 | 66.0 | 62.5 |
| Average molecular weight—calculated from the terminal OH groups | 1,883 | 1,175 | 1,085 |

EXAMPLE 7

According to the process described in Example 1, 100 parts of THF were polymerized in the presence of a catalyst consisting of a mixture of 28 percent fuming sulfuric acid and boron trifluoride-etherate. The results are shown in Table 9.

TABLE 9.—RELATIONS BETWEEN THE AMOUNT OF CATALYST AND THE MOLECULAR WEIGHT AND THE YIELD OF PRODUCED POLYMER

[28% fuming sulfuric acid/$BF_3OEt_2$≅48.57 (constant)]

|  | 28% fuming sulfuric acid (g.) | | | | | |
|---|---|---|---|---|---|---|
|  | 14 | 16 | 20 | 26 | 30 | 34 |
| $BF_3OEt_2$ (g.) | 0.30 | 0.32 | 0.41 | 0.54 | 0.62 | 0.7 |
| Yield (percent)—based on monomer | 51.4 | 68.6 | 65.4 | 71.4 | 60.7 | 62.3 |
| Average molecular weight—calculated from the terminal OH groups | 2,109 | 1,931 | 1,865 | 1,196 | 1,044 | 888 |

EXAMPLE 8

According to the process described in Example 1, 100 parts of THF were dissolved in 30 parts of 1,2-dichloroethane, and to the resulting solution a mixture of 10 parts of 28 percent fuming sulfuric acid and 0.59 part of sodium fluoride was added dropwise; thus, the following results were obtained.

| | |
|---|---|
| Yield of a polymer, percent | 78.7 |
| OH value | 18.0 |
| Average molecular weight—calculated from the terminal OH groups | 6222 |
| Hue of a polymer (APHA) | 15–20 |

The embodiments of the invention in which an exclusive property or privilege is claimed are defined as follows:

1. A process for the polymerization of tetrahydrofuran, which comprises polymerizing tetrahydrofuran at a temperature in the range of —40° C. to +80° C., in the presence of a co-catalyst consisting essentially of (1) from 5 to 50 percent by weight, based on the amount of tetrahydrofuran, of fuming sulfuric acid containing from 23 to 28 wt. percent of $SO_3$, and (2) from about 0.01 to 70 mol percent, based on the mols of $SO_3$, of a fluorine compound selected from the group consisting of sodium fluoride, potassium fluoride, ammonium fluoride, borofluoric acid, ammonium borofluoride, potassium borofluoride, fluorobenzene, fluorotoluene, 2-fluoroethanol, trichlorofluoromethane and trichlorotrifluoroethane, until a polymer is formed, and then hydrolyzing the terminal groups of the polymer.

2. The process as claimed in claim 1 wherein the polymerization reaction is carried out in the absence of a solvent.

3. The process as claimed in claim 1, wherein the polymerization reaction is carried out in the presence of a solvent selected from the group consisting of aliphatic hydrocarbons, alicyclic hydrocarbons, halogenated hydrocarbons, ethers and nitroparaffins.

4. The process as claimed in claim 3, wherein said solvent is 1,2-dichloroethane.

5. The process as claimed in claim 1, wherein the polymerization is stopped by the addition of water, then heating the polymerization system to recover non-reacted tetrahydrofuran, further heating the polymerization system at 90–100° C. to hydrolyze the polymer, cooling the polymerization system so as to separate the polymer having terminal hydroxyl groups at both ends of the molecule as an upper oil layer, subjecting the upper oil layer to neutralization, dehydration and desalting steps to obtain the purified polymer.

References Cited
UNITED STATES PATENTS

| | | | |
|---|---|---|---|
| 3,454,652 | 7/1969 | Dunlop et al. | 260—615 B |
| 2,856,370 | 10/1958 | Muetterties | 260—615 B |
| 3,359,332 | 12/1967 | Johnston | 260—615 B |
| 3,487,115 | 12/1969 | Lovell | 260—615 B |
| 2,751,419 | 6/1956 | Hill et al. | 260—615 B |

FOREIGN PATENTS

| | | | |
|---|---|---|---|
| 766,208 | 6/1953 | Germany | 260—615 |

HOWARD T. MARS, Primary Examiner